June 29, 1965     F. A. KRUSEMARK     3,191,384
MULTI-STAGE HYDRAULIC MASTER CYLINDER
Filed May 17, 1963     2 Sheets-Sheet 1
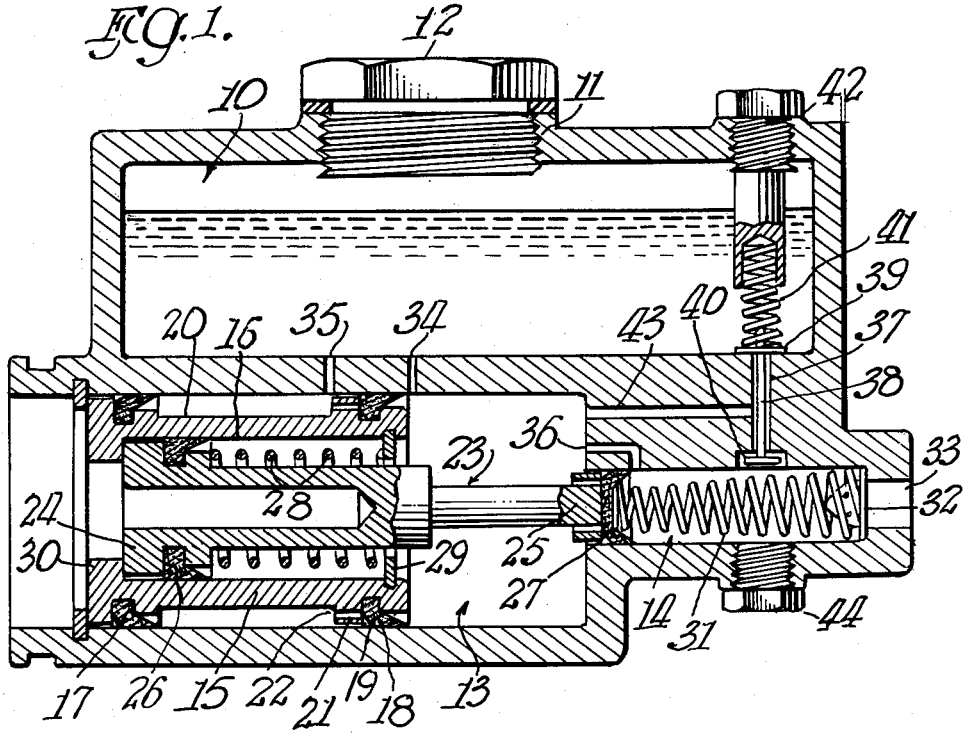
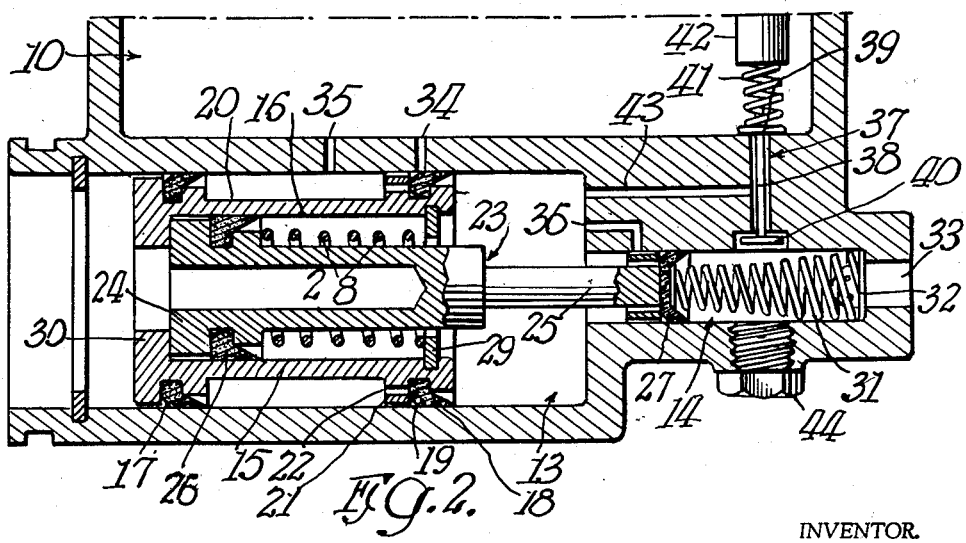
INVENTOR.
Frederick A. Krusemark

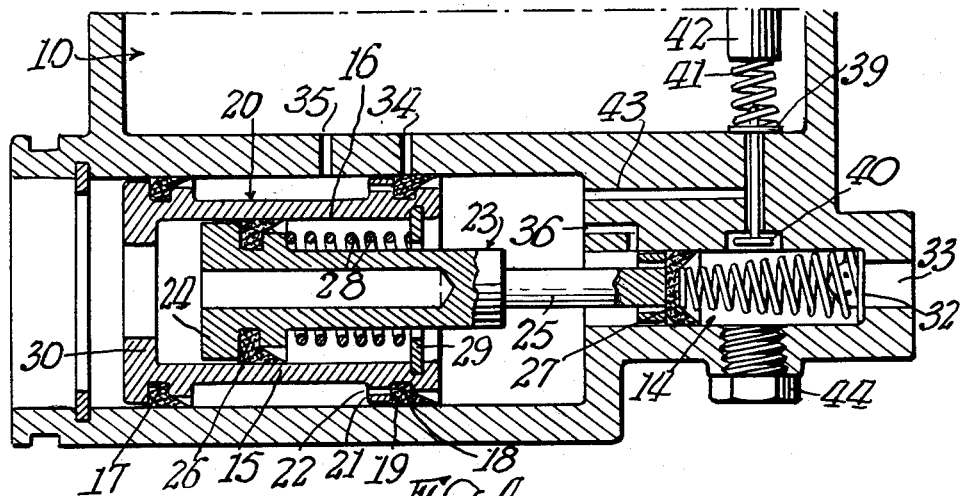
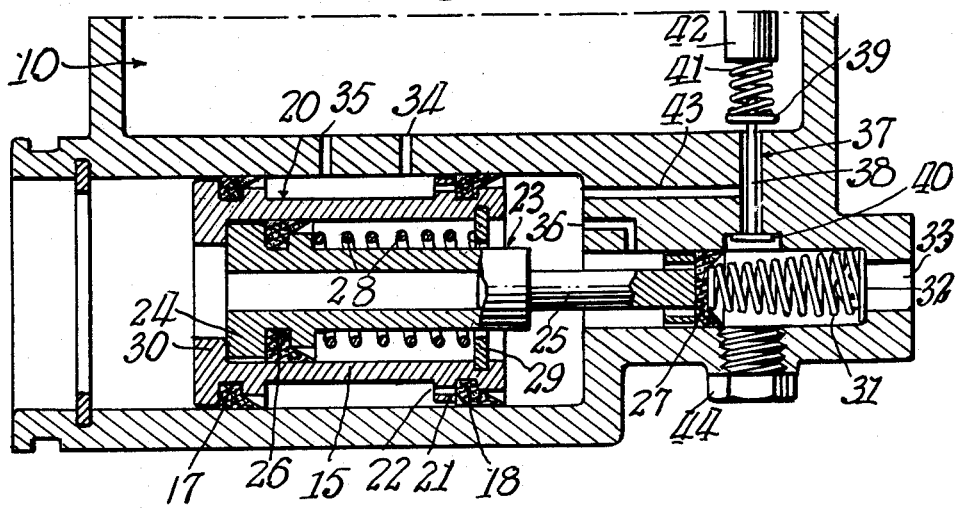

United States Patent Office 3,191,384
Patented June 29, 1965

3,191,384
MULTI-STAGE HYDRAULIC MASTER CYLINDER
Frederick A. Krusemark, 303 S. 2nd Ave., Maywood, Ill.
Filed May 17, 1963, Ser. No. 281,087
5 Claims. (Cl. 60—54.6)

The present application is a continuation-in-part relating to a modification of the accumulator shown in FIGURE 2 of my parent application, Serial No. 132,716, filed August 21, 1961 and now abandoned, for Two-Stage Hydraulic Master Cylinder.

The present invention relates to a multi-stage master cylinder for hydraulic brake systems and particularly to a master cylinder of this type which introduces an unusually large volume of brake fluid into the brake systems, initially, on brake appplication.

Generally, in many multi-stage master cylinders, the resistance of the sensing means which inaugurates the second or last stage of operation, resists the pedal pressure effort also in the last stage of operation and consequently this effort is added to the effort required to stop the car during the last stage of operation.

This undesirable characteristic applies to my application of which this is a continuation-in-part but does not apply to my issued Patent No. 3,062,010, as will be discernible from the drawings.

It is therefore a primary object of the present invention to provide an improved multi-stage master cylinder wherein the sensing means which triggers the last stage of operation does not resist pedal pressure effort during the last stage of operation.

It is an important object of the present invention to provide an improved multi-stage master cylinder which provides an unusually large volume of hydraulic fluid into the braking system during initial pedal travel.

The present invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is a longitudinal sectional view, the parts being shown in the relative positions in the retracted position of the master cylinder;

FIGURE 2 is a longitudinal sectional view, the parts being shown in the relative positions which they assume when the brake pedal is started forwardly;

FIGURE 3 is a longitudinal sectional view, the parts being shown in the relative positions which they assume when the brake pedal is moved still farther forwardly; and, FIGURE 4 is a longitudinal sectional view, the parts being shown in the relative positions which they assume when the brake pedal has been moved forwardly to a point initiating the last stage of operation.

Like characters of reference designate like parts in the several drawings.

The important feature of the present invention is to provide an unusually large quantity of hydraulic fluid in the brake system during initial pedal travel in order to take up the slack in the brake system up to at least the point when the brake shoes contact the brake drums, thus requiring less pedal travel, initially, during this period as compared with many multi-stage master cylinders.

This is so, because the common practice is to provide a piston for first stage operation, which as to size, is comparable to the piston size of the master cylinder which it replaces.

In the present invention, the piston for first stage operation, which is of a size normally used, is encompassed by a sleeve which serves as a piston during initial pedal travel, after which it serves as an accumulator for a predetermined period only, as hereinafter more fully explained.

Referring now to the drawings, FIGURE 1 shows the master cylinder according to the present invention, formed as an integral casting having a fluid reservoir 10 provided with an internally threaded opening 11 for facilitating filling, which opening is closed by a filler cap 12 of a conventional type. The lower portion of the casting is formed to provide a relatively large low pressure cylinder 13 extending longitudinally of the casting and forwardly thereof, and coaxially therewith, a relatively small high pressure cylinder 14.

The low pressure cylinder 13 is provided with a cylindrical sleeve 15 operable therein, provided with a longitudinal cylindrical bore 16 therein and conventional sealing rings 17 and 18 at opposite ends thereof. At the forward end of the cylindrical sleeve 15, the sealing ring 18 may be provided with flutes 19 at its rear periphery to facilitate fluid passage thereover on return movement of the sleeve 15. A wide annular groove 20 may be provided around the outer periphery of the sleeve 15 which provides a flange 21 having holes 22 therethrough which facilitate movement of fluid on return movement of the sleeve 15.

A compound piston 23 is provided with a relatively large piston head 24 and a relatively small piston head 25, having a sealing ring 26 and a sealing cup 27, respectively, which are operable in the longitudinal cylindrical bore 16 and the high pressure cylinder 14, respectively.

A spring 28 is interposed between the large piston head 24 and a retaining ring 29 within one end of the cylindrical bore 16, urging the large piston head 24 against an annular flange 30 at the opposite end of the cylindrical bore 16.

A return spring 31 extending longitudinally within the high pressure cylinder 14 is interposed between the sealing cup 27 and a check valve 32 which overlies an outlet 33 through which fluid passes into the brake system.

A first port 34 in fluid communication between the fluid reservoir 10 and the low pressure cylinder 13 is provided just ahead of the pressure sealing ring 18 and a second port 35 in communication between the fluid reservoir 10 and the low pressure cylinder 13 is provided just rearwardly of the sealing ring 18. A first fluid passage 36 extends from the low pressure cylinder 13 to the high pressure cylinder 14, terminating just in front of the sealing cup 27. A second fluid passage 37 extends vertically between the fluid reservoir 10 and the high pressure cylinder 14 which is provided with a double end valve 38 having a first valve head 39 operable for opening and closing fluid communication to the fluid reservoir 10 and a second valve head 40 operable for opening and closing fluid communication to the high pressure cylinder 14.

A spring 41 is interposed between the first valve head 39 and a plug 42 threaded through the casting, urging the valve head 37 in a direction to close communication with the fluid reservoir 10.

A third fluid passage 43 extends longitudinally in fluid communication between the low pressure cylinder 13 and the second fluid passage 37. A plug 44 is provided for accessibility with respect to mounting the double end valve 38.

In operation the initial actuation of the brake pedal (not shown) through its connection with the recessed end of the compound piston 23 produces a discharge of an unusually large volume of fluid to the brake lines, thereby taking up the slack in the brake cylinders of the respective wheels of the automobile and bringing the brake shoes into pressure contact with their respective brake drums.

Thus, a much larger volume of brake fluid is delivered to a brake system, initially, for the same pedal travel as compared with either a conventional master cylinder or other multi-stage master cylinders designed for a given brake system.

This is so because in the present invention the volume of fluid delivered, initially, is based on the combined areas of the faces of the sleeve 15, the large piston head 24 and the small piston head 25, as compared to conventional master cylinders or currently available multi-stage master cylinders where the volume of fluid delivered initially is based on the area provided by the diameter of the large piston only. This means, that comparably, the pedal travel is reduced appreciably during the period when the slack is taken up in the system and held in reserve to compensate for the comparably longer travel during the last stage of brake application.

It should be noted that fluid initially will enter the high pressure cylinder 14 by way of the first, second and third fluid passages and possibly over the lip of the sealing cup 27, and that subsequent piston travel closes off direct communication between the low and high pressure cylinders 13 and 14 by way of the first fluid passage 36 because of the forward movement of the sealing cup 27. Of course, fluid will continue to enter the high pressure cylinder 14 from the low pressure cylinder 13 by means referred to above, until the last stage of operation as hereinafter shown.

Following this initial brake application as shown in FIGURE 2, additional pressure applied to the brake pedal builds up the pressure in the system to a value exceeding that of the value of spring 28 which causes the cylindrical sleeve 15 to stop in its forward motion and subsequently recede, thus serving as an accumulator, and fluid to the brake system is now supplied only by the combined areas of the large and small piston heads 24 and 25, respectively, as shown in FIGURE 3.

The application of still additional pressure to the brake pedal builds up pressure in the brake system to a value to overcome the value of the spring 41 which causes the valve head 40 to close communication between the low and high pressure cylinders 13 and 14, respectively, because second and third fluid passages 37 and 43 are closed with respect to the high pressure cylinder 14. Substantially simultaneously therewith valve head 39 uncovers the second fluid passage 37 thereby permitting fluid from the low pressure cylinder 13 to be dumped into the fluid reservoir 10 via the third fluid passage 43 as shown in FIGURE 4.

Thus, in the last stage of brake application there is no pressure build up in the low pressure cylinder 13 which has to be overcome by pedal pressure effort, and therefore substantially full value is had of the mechanical advantage based on the ratio between the large and small piston heads 24 and 25, respectively, in the last stage of operation.

I wish it to be understood that the present invention is not to be limited to the specific constructions and arrangements shown and described except only insofar as the appended claims may be so limited, as it will be apparent to those skilled in the art that changes may be made without departing from the principles of the invention.

I claim:
1. A multi-stage master cylinder for a hydraulic brake system, comprising in combination:
 (a) a low pressure cylinder,
 (b) a high pressure cylinder in coaxial alignment and communication with said low pressure cylinder,
 (c) a cylindrical sleeve operable in said pressure cylinder,
 (d) a cylindrical bore in said sleeve,
 (e) a compound piston having a relatively large piston head and a relatively small piston head operable within said cylindrical bore and said high pressure cylinder, said compound piston being directly operably connected to a brake pedal,
 (f) a first spring interposed between said relatively large piston head and a retaining means at one end of said cylindrical bore, urging said relatively large piston head against an annular flange at the opposite end of said cylindrical bore,
 (g) a return spring in said high pressure cylinder interposed between said relatively small piston head and a check valve that overlies an outlet,
 (h) a fluid reservoir for supplying fluid to said cylinders,
 (i) a valve means spring influenced to a normally closed position with respect to said fluid reservoir and to an open position with respect to said high pressure cylinder,
 (j) a first fluid passage in intercommunication between said low pressure cylinder and said valve means,
 (k) a second fluid passage in intercommunication between said low pressure cylinder and said high pressure cylinder,
 (l) and a first port communicable between said fluid reservoir and said low pressure cylinder positioned slightly forward of said cylindrical sleeve.

2. A multi-stage master cylinder according to claim 1 wherein the said relatively large and small piston heads are provided with a sealing ring and a sealing cup respectively and the cylindrical sleeve is provided with sealing rings at opposite ends thereof.

3. A multi-stage master cylinder according to claim 1 wherein a second port is provided rearwardly from the forward end of said cylindrical sleeve.

4. A multi-stage master cylinder according to claim 1 wherein stop means are provided to limit the rearward movement of said sleeve.

5. A multi-stage master cylinder according to claim 1 wherein the said valve means comprises a double end valve.

References Cited by the Examiner
UNITED STATES PATENTS

| 2,291,056 | 7/42 | Pallady | 60—54.6 |
| 2,804,750 | 9/57 | Foreman | 60—54.6 |

FOREIGN PATENTS 841,804  2/39  France.

JULIUS E. WEST, Primary Examiner.

EDGAR W. GEOGHEGAN, Examiner.